(12) United States Patent
Rindeskar

(10) Patent No.: US 11,598,159 B2
(45) Date of Patent: Mar. 7, 2023

(54) COUPLING FOR CONNECTING DOWNHOLE TUBULARS

(71) Applicant: SANDVIK MINING AND CONSTRUCTION TOOLS AB, Sandviken (SE)

(72) Inventor: Andreas Rindeskar, Hofors (SE)

(73) Assignee: Sandvik Mining and Construction Tools AB, Sandviken (SE)

( * ) Notice: Subject to any disclaimer, the term of this patent is extended or adjusted under 35 U.S.C. 154(b) by 84 days.

(21) Appl. No.: 16/978,821

(22) PCT Filed: Feb. 22, 2019

(86) PCT No.: PCT/EP2019/054453
§ 371 (c)(1),
(2) Date: Sep. 8, 2020

(87) PCT Pub. No.: WO2019/170436
PCT Pub. Date: Sep. 12, 2019

(65) Prior Publication Data
US 2021/0047889 A1 Feb. 18, 2021

(30) Foreign Application Priority Data
Mar. 9, 2018 (EP) .................................... 18160858

(51) Int. Cl.
*E21B 17/042* (2006.01)
*F16L 15/06* (2006.01)

(52) U.S. Cl.
CPC ...... *E21B 17/0423* (2013.01); *E21B 17/0426* (2013.01); *F16L 15/06* (2013.01)

(58) Field of Classification Search
CPC ...... E21B 17/0426; F16L 15/06; F16L 15/001
See application file for complete search history.

(56) References Cited

U.S. PATENT DOCUMENTS

| | | | | |
|---|---|---|---|---|
| 2,054,118 A | * | 9/1936 | Harrington | ........... F16L 15/001 285/333 |
| 4,121,862 A | | 10/1978 | Greer | |
| 4,295,751 A | | 10/1981 | Holmberg | |
| 4,332,502 A | * | 6/1982 | Wormald | ............ E21B 17/0426 403/343 |
| 4,588,213 A | | 5/1986 | Bollfrass et al. | |
| 4,687,368 A | * | 8/1987 | Eklof | .................. E21B 17/0426 285/334 |

(Continued)

FOREIGN PATENT DOCUMENTS

| | | |
|---|---|---|
| CL | 201303087 | 10/2013 |
| CL | 201303323 | 11/2013 |

(Continued)

*Primary Examiner* — David Bochna
(74) *Attorney, Agent, or Firm* — Corinne R. Gorski

(57) ABSTRACT

A coupling for connecting downhole tubulars includes a tubular body, and at least one thread of a male screw thread formed on an outer surface of the body, and a female screw thread formed in an inner surface of the body. The at least one thread has a thread-form including a crest, a root, and a pair of flanks. The crest and the root are each cambered about a respective first and second camber radius. Each camber radius is greater than an outer diameter of the coupling.

16 Claims, 9 Drawing Sheets

(56) References Cited

U.S. PATENT DOCUMENTS

| | | | | |
|---|---|---|---|---|
| 4,861,209 | A * | 8/1989 | Larsson | E21B 17/0426 411/366.3 |
| 6,196,598 | B1 * | 3/2001 | Yao | E21B 17/0426 285/333 |
| 6,767,156 | B1 * | 7/2004 | Larsson | E21B 17/0426 403/343 |
| 3,066,307 | A1 | 11/2011 | Wahlstrom et al. | |
| 2002/0074797 | A1 * | 6/2002 | Liljebrand | E21B 17/0426 285/333 |
| 2006/0118340 | A1 | 6/2006 | Wahlstrom et al. | |
| 2010/0140929 | A1 * | 6/2010 | Nava | E21B 17/0426 285/333 |
| 2011/0168286 | A1 * | 7/2011 | Koch | F16L 15/06 138/89 |
| 2014/0083778 | A1 * | 3/2014 | Beronius | E21B 17/0426 175/293 |
| 2018/0258709 | A1 * | 9/2018 | Yoneyama | E21B 17/0426 |

FOREIGN PATENT DOCUMENTS

| | | |
|---|---|---|
| CL | 201600521 | 3/2016 |
| CL | 201701287 | 5/2017 |
| CL | 201702940 | 11/2017 |
| CL | 2017072941 | 11/2017 |
| CL | 2020002281 A1 | 1/2020 |
| JP | 2006241837 A | 9/2006 |

* cited by examiner $$R_b = \frac{4L^2 + 4*\left(\frac{D_0}{2} - \frac{D_1}{2}\right)^2}{8*\left(\frac{D_0}{2} - \frac{D_1}{2}\right)}$$

FIG. 3A $$\tan\gamma = \frac{L}{R_b - (D_0 - D_1)}$$

FIG. 3B $$0 < t < 1 \begin{cases} R(t) = \dfrac{D_0}{2} - R_b * (1 - \cos(t * \gamma)) \\ \text{FIG. 3D} \\ \\ x(t) = R(t) * \sin(-2\pi * t * N) \\ \text{FIG. 3E} \\ \\ y(t) = R(t) * \cos(-2\pi * t * N) \\ \text{FIG. 3F} \\ \\ z(t) = -R(t) * \sin(t * \gamma) \\ \text{FIG. 3G} \end{cases}$$

FIG. 3C

COUPLING FOR CONNECTING DOWNHOLE TUBULARS

RELATED APPLICATION DATA

This application is a § 371 National Stage Application of PCT International Application No. PCT/EP2019/054453 filed Feb. 22, 2019 claiming priority to EP 18160858.9 filed Mar. 9, 2018.

FIELD OF INVENTION

The present disclosure generally relates to a cambered thread for a drill string coupling and in particular, although not exclusively, for a drill string utilized for percussion rock drilling.

BACKGROUND

EP 1 511 911/U.S. Pat. No. 8,066,307 discloses a screw joint for a drill run or drill string for percussion rock drilling including male and female screw threads on the elements to be joined together to form a drill string, characterized in that the male thread and the female thread have a trapezoidal shape; that the threads have a conical inclination along the length of the threads with a cone angle smaller than 7 degrees, and in that the flank angles between the flanks of the threads and the line that is tangential with the apices of the threads is smaller than 45 degrees.

The conical thread of the EP '911 patent is not optimal for distributing bending load evenly across the length thereof nor does the conical thread result in expedient coupling and uncoupling time. The wear resistance of the conical thread of the EP '911 patent leaves room for improvement.

Accordingly it is desirable to provide an improved drill string thread for percussion rock drilling that does not suffer from the shortcomings of the conical thread.

SUMMARY OF THE INVENTION

The present disclosure generally relates to a cambered thread for a drill string coupling and in particular, although not exclusively, for a drill string utilized for percussion rock drilling. In one embodiment, a coupling for connecting downhole tubulars includes: a tubular body; a female coupling part; a male coupling part; and at least one of: a male screw thread formed on an outer surface of the body, and a female screw thread formed in an inner surface of the body. The at least one thread has a thread-form including a crest, a root, and a pair of flanks. The crest and the root are each cambered about a respective first and second camber radius. Each camber radius is greater than an outer diameter of the coupling.

Advantageously, relative to the conical thread of the EP '911 patent, the cambered threads exhibit improved coupling characteristics and improved stiffness when subject to bending loads. The cambered threads reduce coupling and uncoupling time. The cambered threads distribute the bending load more evenly across the length due to the curvature thereof aligning better with a curvature of the bending. The cambered threads also exhibit superior wear resistance due to the direction of the contact forces being more perpendicular, thereby reducing the sliding forces.

In one aspect of the embodiment, each flank is straight, and each flank is connected to an adjacent crest and/or root by a respective arc.

In another aspect of the embodiment, a centerline of the thread-form perpendicular to an arc of each camber radius is inclined relative to a longitudinal axis of the coupling by an acute and nearly perpendicular first angle adjacent to a start of the at least one thread and inclined by a second angle adjacent to an end of the at least one thread, and the second angle is less than the first angle.

In another aspect of the embodiment, each camber radius is at least 5 times greater than an outer diameter of the coupling. In another aspect of the embodiment, the thread-form is asymmetric. In another aspect of the embodiment, the thread-form is trapezoidal. In another aspect of the embodiment, a sweep angle of the at least one thread ranges between one and 10 degrees. In another aspect of the embodiment, the root and the crest are concentric. In another aspect of the embodiment, an arc length of the root and an arc length of the crest are equal. In another aspect of the embodiment, an arc length of the root and an arc length of the crest are not equal.

In another aspect of the embodiment, a connection includes: a female coupling part having the female thread; and a male coupling part having the male thread and screwed into the female thread. One of the flanks is a contact flank and the other flank is a non-contact flank when the couplings are in compression. Each flank is straight. Each thread-form has a centerline perpendicular to an arc of each respective camber radius. Each flank has a flank angle inclined relative to the respective centerline. Each contact flank angle is greater than the respective non-contact flank angle.

Optionally, each non-contact flank angle is less than 45 degrees. Since the EP '911 patent defines flank angle as being measured from the thread apex, then the EP '911 teaching translates to flank angles being greater than 45 degrees. Minimizing the non-contact flank angle facilitates uncoupling and facilitates transmission of the shockwave during uncoupling.

In another aspect of the embodiment, each coupling is made from a metal or alloy. The male coupling part has an outer diameter portion, a reduced diameter portion having the male thread, and a shoulder connecting the two portions. The shoulder is engaged with an end of the female coupling part to form a metal to metal seal.

In another aspect of the embodiment, a drill rod for percussive drilling includes: a rod body; a female coupling part having the female thread and welded to a first end of the rod body; and a male coupling part having the male thread and welded to a second end of the rod body. Optionally, an outer diameter of the couplings ranges between 5 and 20 centimeters, and each camber radius is greater than one meter.

In another aspect of the embodiment, a drill string includes a drill rod.

BRIEF DESCRIPTION OF DRAWINGS

A specific implementation of the present invention will now be described, by way of example only, and with reference to the accompanying drawings in which:

FIGS. 3A-3G illustrate formulas for the cambered helix;

DETAILED DESCRIPTION

Figure 1:
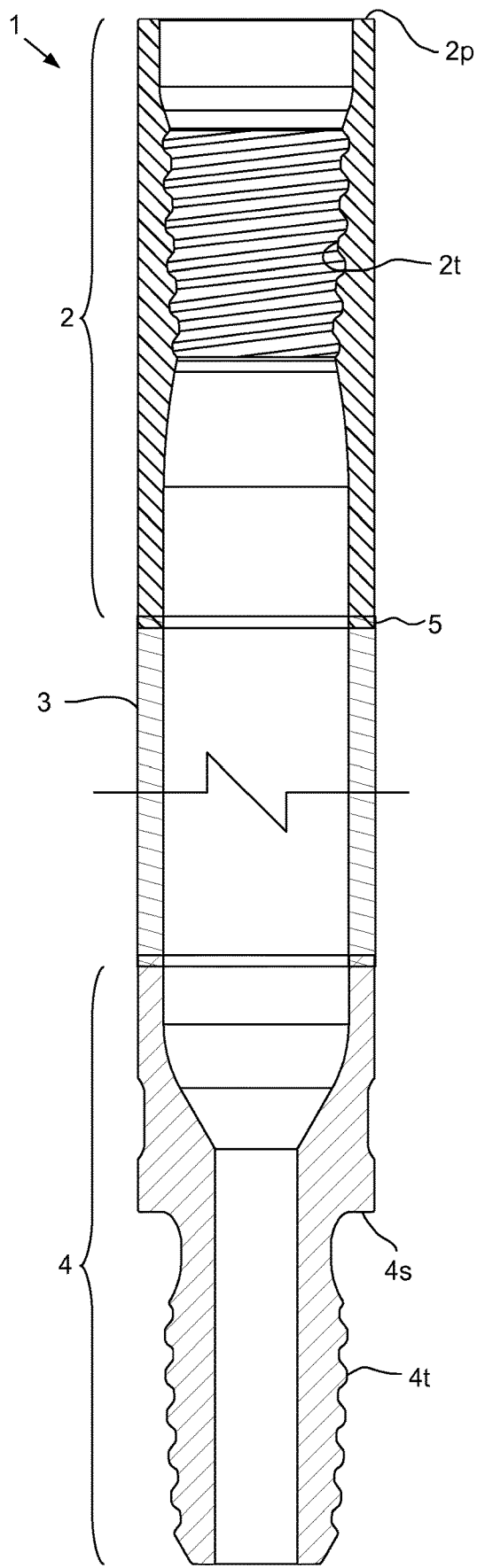
FIG. 1 illustrates a drill rod having a male coupling and a female coupling, each coupling including a cambered screw thread, according to one embodiment of the present disclosure.

FIG. 1 illustrates a drill rod 1 having a female coupling 2 and a male coupling 4, each coupling including a respective cambered screw thread 2t, 4t, according to one embodiment of the present disclosure. The drill rod 1 may be made from a metal or alloy, such as steel. The drill rod 1 may also be case hardened, such as by carburization. Each coupling 2, 4 may be attached, such as welded 5, to an intermediate rod body 3 so as to form longitudinal ends of the drill rod 1. Each weld 5 may be seamless, such as a friction weld. The drill rod 1 may have a flow bore formed therethrough. The drill rod 1 may have a length of 6 meters.

A drill string (not shown) may be formed by screwing together a plurality of drill rods 1 together (FIG. 8) along with a drill bit at one end and a shank adapter at the other end. The drill bit and shank adapter may also have either of the cambered screw threads 2t, 4t. The drill string may be used for percussion rock drilling with a top hammer (not shown) or downhole hammer (not shown). If a downhole hammer is used, the hammer may have each of the cambered screw threads 2t, 4t for assembly as part of the drill string.

Alternatively, the drill rod 1 may have a pair of male couplings 4 and a sleeve (not shown) having a pair of female couplings 2 may be used to connect a pair of drill rods together. Alternatively, the cambered screw threads 2t, 4t may be used to connect other types of downhole tubulars, such as oilfield drill pipe, oilfield casing or liner, oilfield production tubing, or oilfield sucker rod.

The male coupling part 4 may have a tubular body with an outer diameter upper portion for connection to a lower end of the rod body 3, a reduced diameter lower portion having the external male thread 4t formed in an outer surface thereof, and a shoulder 4s connecting the upper and lower portions. The upper portion of the male coupling part may have a plurality of wrench flats formed in an outer surface thereof. The flow bore in the upper portion may include a nozzle and a portion of a throat. The throat may extend through the shoulder 4s and the lower portion.

Figure 8:
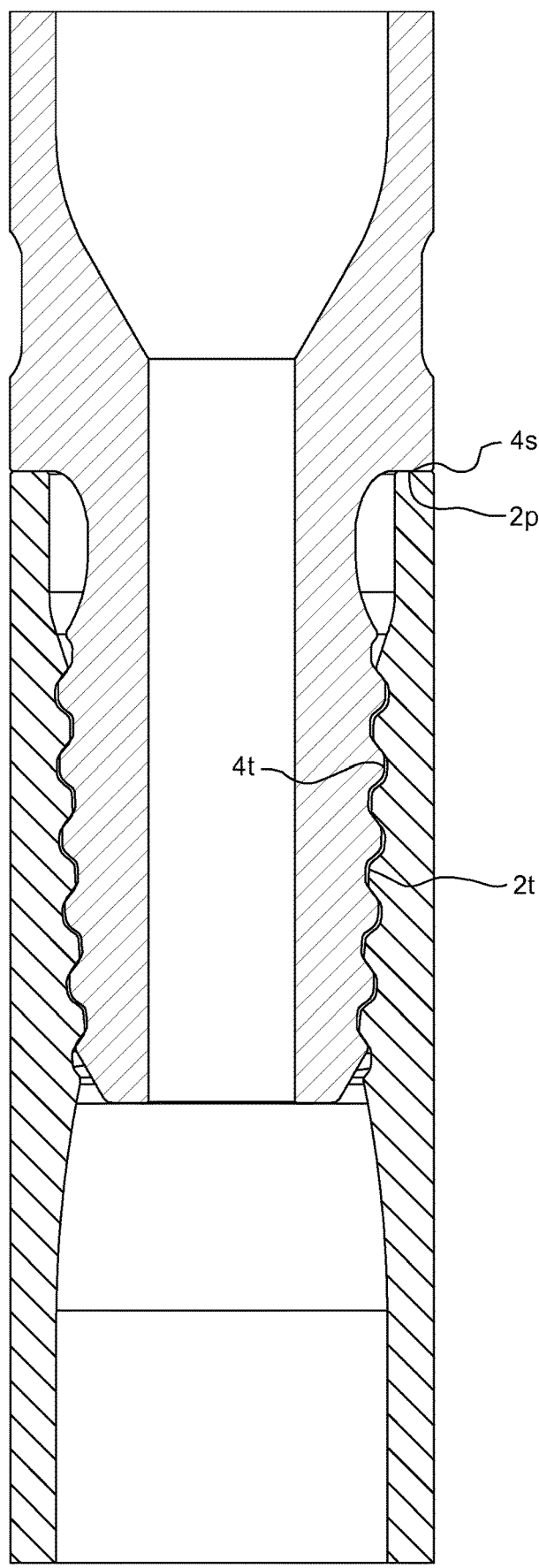
FIG. 8 illustrates the male and female couplings screwed together.

The female coupling part 2 may have a tubular body with a lower portion for connection to an upper end of the rod body 3. The female coupling part 2 may have the internal female thread 2t formed in an inner surface thereof adjacent to the flow bore thereof. The flow bore may be sized to receive the reduced diameter lower portion of the male coupling part 4 of another drill rod (FIG. 8). The male coupling part 4 may be screwed into the female coupling part 2 until the shoulder 4s abuts a top 2p of the female coupling, thereby creating a metal-to-metal seal for isolating the flow bore and fastening the two drill rods together.

The flow bore of the female coupling part 2 may include a diffuser located adjacent to a lower end of the female thread 2t.

Alternatively, the male coupling part 4 may be connected to an upper end of the rod body 3 and the female coupling part 2 may be connected to a lower end of the rod body. In this alternative, the nozzle of the male coupling part 4 would be a diffuser and the diffuser of the female coupling part 2 would be a nozzle.

Figure 2A:
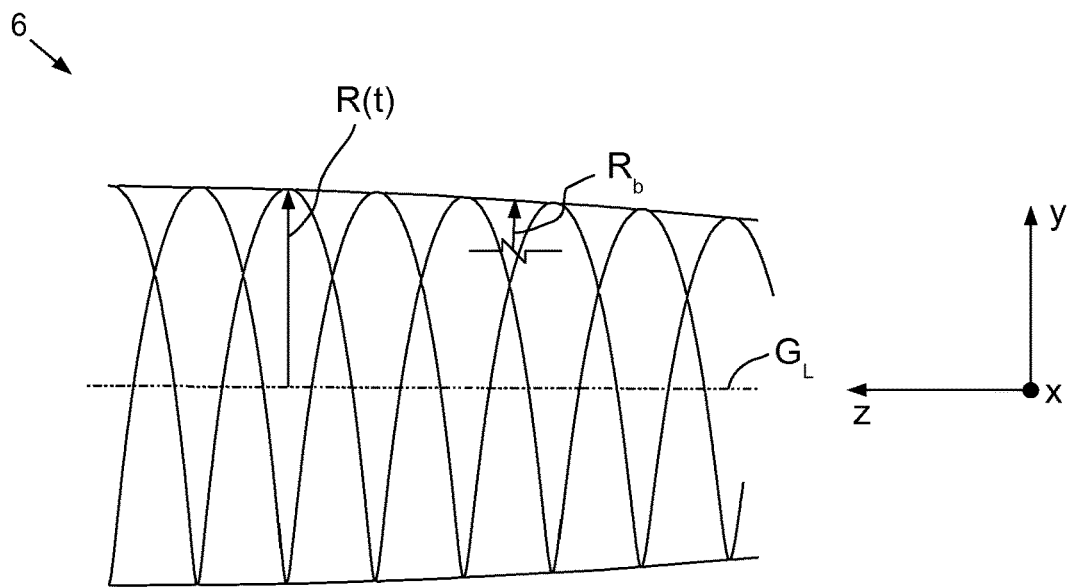
FIG. 2A illustrates a cambered helix for designing the cambered threads.
Figure 2B:
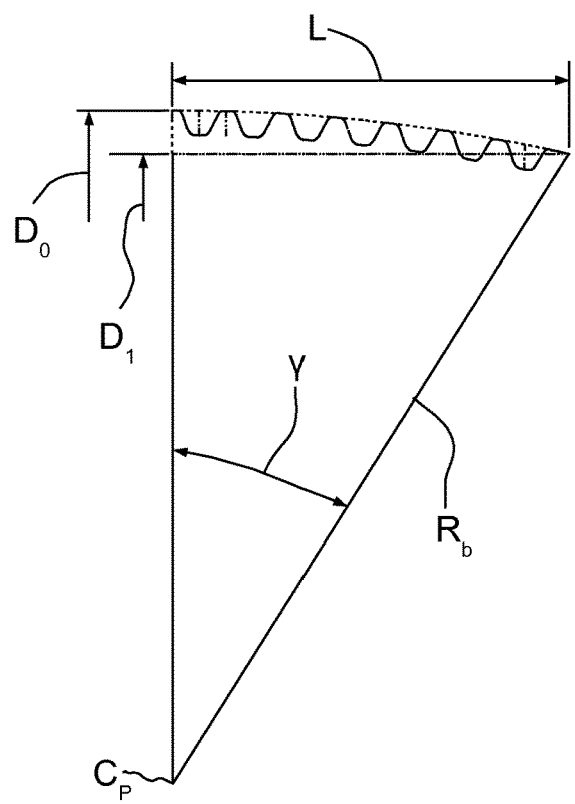
FIG. 2B illustrates parameters of the cambered threads.

FIG. 2A illustrates a cambered helix 6 for designing the cambered threads 2t, 4t. FIG. 2B illustrates parameters of the cambered threads 2t, 4t. FIGS. 3A-3G illustrate formulas for the cambered helix 6. To design the cambered threads 2t, 4t, one or more thread parameters, such as a start diameter $D_0$, an end diameter $D_1$, and a (linear) length L, may be specified utilizing dimensions of the drill rod 1. Once the thread parameters have been specified, a camber radius $R_b$ may be calculated utilizing the formula of FIG. 3A. The camber radius $R_b$ may extend from a centerpoint $C_P$ and may define crests of the male thread 4t and roots of the female thread 2t. The thread parameters may be specified such that the camber radius $R_b$ is greater than, such as 5 or 10 times greater than, an outer diameter of the coupling parts 2, 4. The outer diameter of the coupling parts 2, 4 may range between 5 and 20 centimeters and the camber radius $R_b$ may be greater than one meter, such as ranging between 1.05 meters and 1.7 meters.

Once the camber radius $R_b$ has been calculated, a sweep angle γ may be calculated utilizing the formula of FIG. 3B. The sweep angle γ may range between one and ten degrees. Once the sweep angle γ has been calculated, the cambered helix 6 may be generated using the parametric formulas of FIGS. 3C-3G. The cambered helix 6 may be used to define an outline of the cambered threads 2t, 4t. In the parametric formulas, R(t) may be a radial coordinate of the cambered helix about a longitudinal axis $G_L$ of the drill rod 1. The convention of the formulas of FIGS. 3E-3G may be negative (shown) for a left-handed thread and positive for a right-handed thread.

The female 2t and male 4t threads may be complementary such that the male thread of one drill rod 1 may be screwed into the female thread of another drill rod (FIG. 8). To facilitate screwing and unscrewing of the threads 2t, 4t, the male 4t and female 2t threads may be similar but not be identical mirror images of each other. The above discussed design process may be performed once for the female thread 2t and again for the male thread 4t. Each of the female 2t and male 4t threads may be double threads.

Alternatively, the cambered threads 2t, 4t may be right-handed threads. Alternatively, each of the female 2t and male 4t threads may be a single thread or triple threads.

Figure 4:
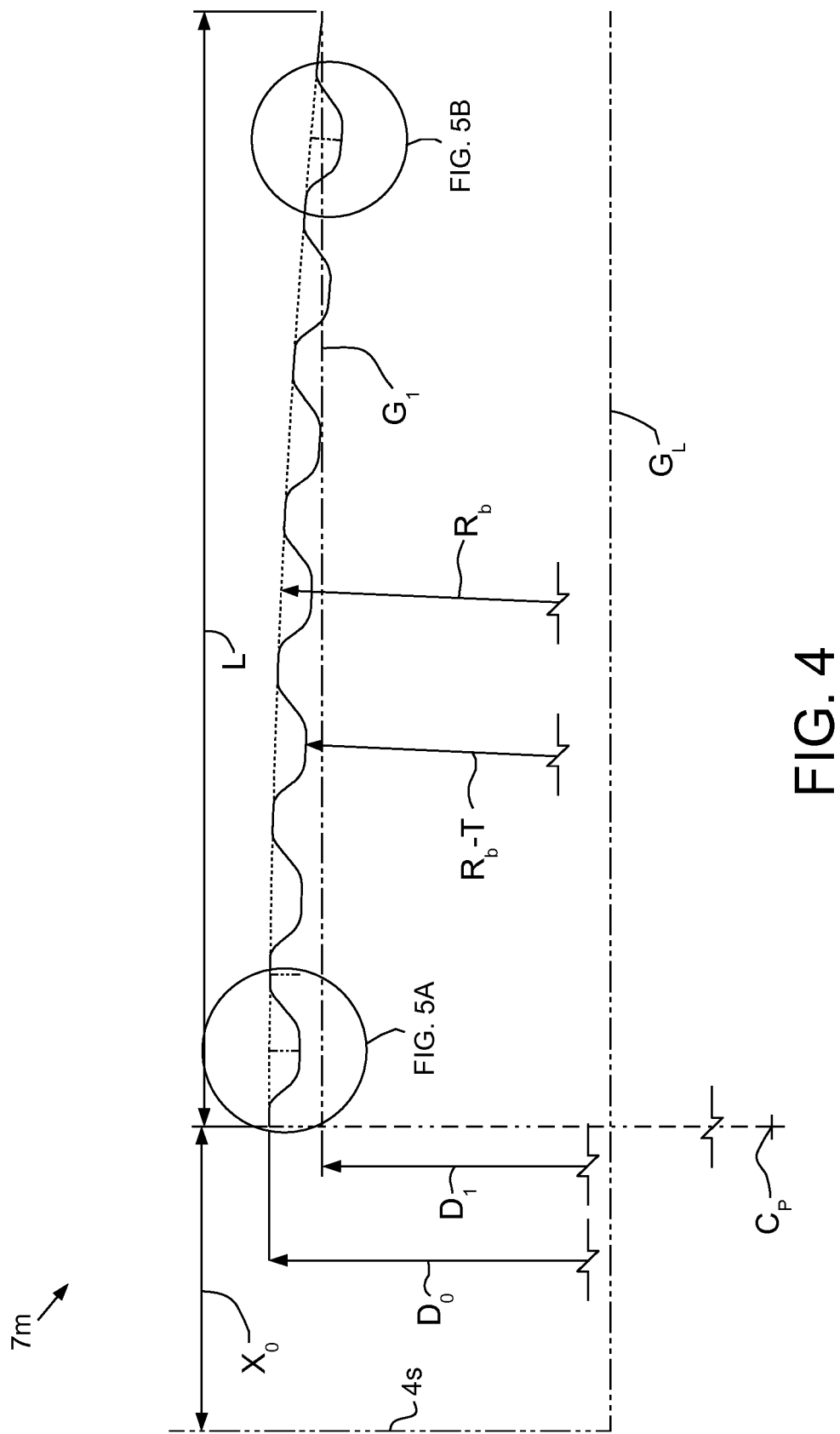
FIG. 4 illustrates a profile of the male cambered thread.
Figure 5A:
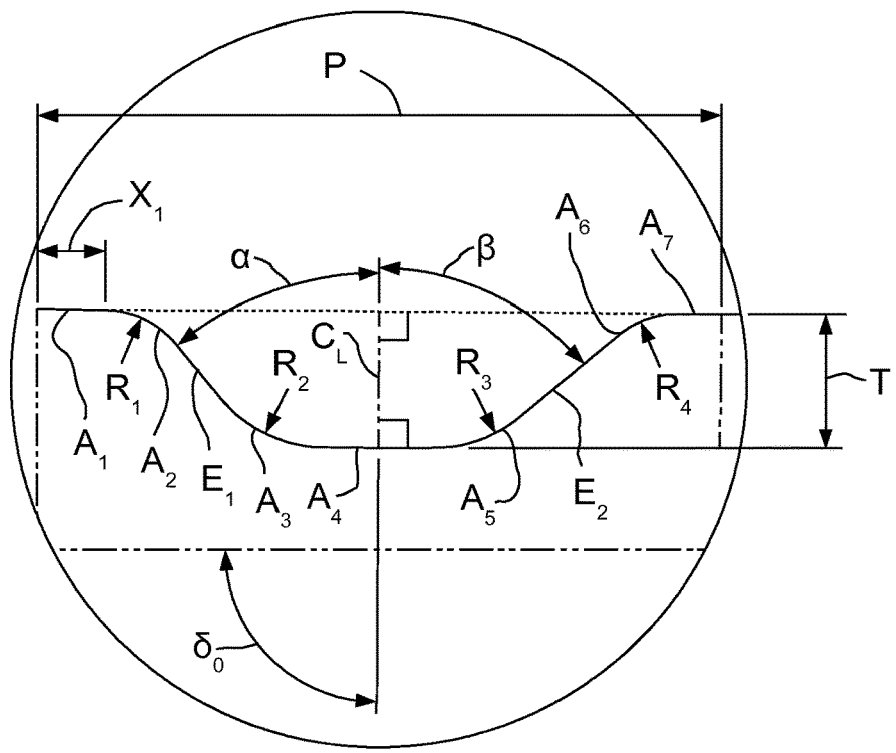
FIGS. 5A and 5B are enlargements of portions of FIG. 4.
Figure 5B:
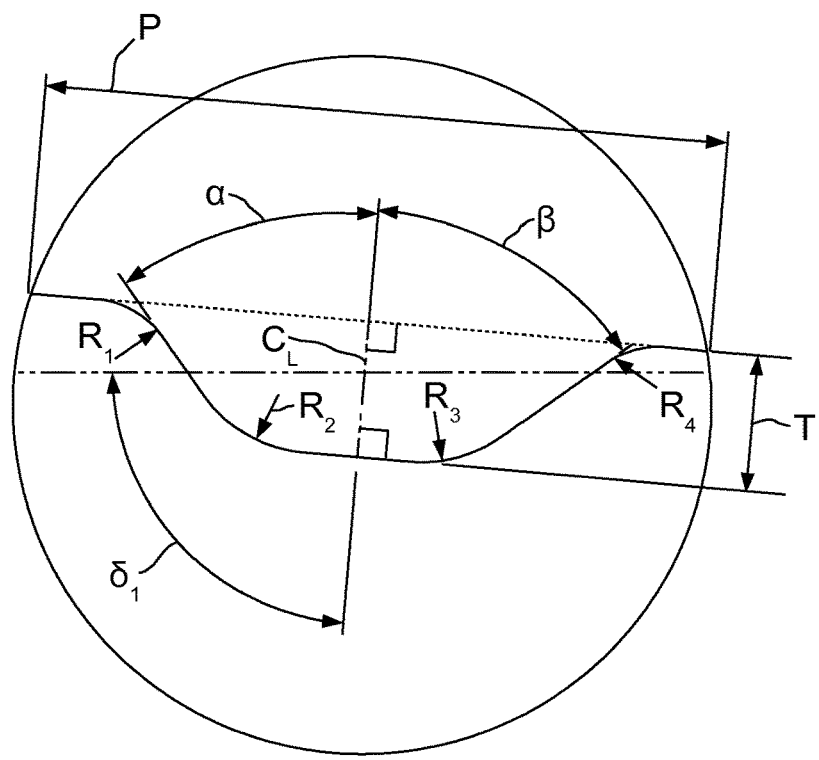

FIG. 4 illustrates a profile 7m of the male cambered thread 4t. FIGS. 5A and 5B are enlargements of portions of FIG. 4. Once the outline of the male thread 4t has been generated, the profile 7m may be determined. The profile 7m may start at a standoff distance $X_0$ from the shoulder 4s. The profile 7m may end at a point where the crest of the profile intersects an axis $G_1$ parallel to the longitudinal axis $G_L$ and offset to the end diameter $D_1$. The sweep angle γ may define the arcuate extent of the profile 7m from start to end and may range between one and 10 degrees.

Referring specifically to FIG. 5A, a thread-form of the profile 7m may include a first crest $A_1$. The thread-form may have a trapezoidal shape. The first crest $A_1$ may be an arc with the (outer) camber radius $R_b$ and may extend to a second arc $A_2$. The centerline $C_L$ may be inclined relative to the offset axis $G_1$ at an acute and nearly perpendicular first angle $\delta_0$. The second arc $A_2$ may have a radius less than one percent of the outer camber radius $R_b$. The second arc $A_2$ may extend from the first crest $A_1$ to a non-contact flank $E_1$. The second arc $A_2$ may be tangential to the first crest $A_1$ and the non-contact flank $E_1$.

The non-contact flank $E_1$ may be a straight line inclined at a first flank angle α relative to the centerline $C_L$. The first flank angle α may range between 35 and 55 degrees or the first flank angle may be less than 45 degrees. The non-contact flank $E_1$ may extend from the second arc $A_2$ to a third arc $A_3$. The third arc $A_3$ may have a radius less than one percent of the outer camber radius $R_b$. The third arc $A_3$ may extend from the non-contact flank $E_1$ to a first root $A_4$. The third arc $A_3$ may be tangential to the non-contact flank $E_1$ and the first root $A_4$. The thread-form may have a height T between the first root $A_4$ and a second crest $A_7$. The first root $A_4$ may be an arc with an inner camber radius $R_b$-T and may extend from the third arc $A_3$ to a fifth arc $A_5$. The height T may be less than one percent of the outer camber radius $R_b$ such that the inner camber radius $R_b$-T is also greater than the outer diameter of the male coupling part 4, as discussed above for the camber radius. The first root $A_4$ may be concentric with the first crest $A_1$. The centerline $C_L$ may be perpendicular to an arc of each camber radius $R_b$, $R_b$-T.

The fifth arc $A_5$ may have a radius less than one percent of the camber radius $R_b$. The fifth arc $A_5$ may extend from the first root $A_4$ to a contact flank $E_2$. The fifth arc $A_5$ may be tangential to the first root $A_4$ and the contact flank $E_2$. The contact flank $E_2$ may be a straight line inclined at a second flank angle relative to the centerline $C_L$. The second flank angle may range between 40 and 45 degrees. The first flank angle α may be less than the second flank angle, thereby resulting in an asymmetric thread-form. The contact flank $E_2$ may extend from the fifth arc $A_5$ to a sixth arc $A_6$. The sixth arc $A_6$ may extend from the contact flank $E_2$ to the second crest $A_7$. The sixth arc $A_6$ may be tangential to the contact flank $E_2$ and the second crest $A_7$. The second crest $A_7$ may be an arc with the outer camber radius $R_b$.

The thread-form may have an (arc length) pitch P between a start of the profile 7m and a center of the second crest $A_7$. The first crest $A_1$ may have an arc length $X_1$ which may also be equal to one-half the arc-length of the second crest $A_7$. The first root $A_4$ may also have an arc length equal to twice that of the arc length $X_1$.

Alternatively, the crests and roots may have different arc lengths. Alternatively, the second flank angle may be less than 45 degrees.

Referring specifically to FIG. 5B, due to the camber of the profile 7m about each camber radius $R_b$, $R_b$-T, the centerline $C_L$ of the thread-form adjacent to the end of the profile 7m may be inclined relative to the offset axis $G_1$ at a second acute angle $\delta_1$ which is less than the first angle $\delta_0$.

Figure 6:
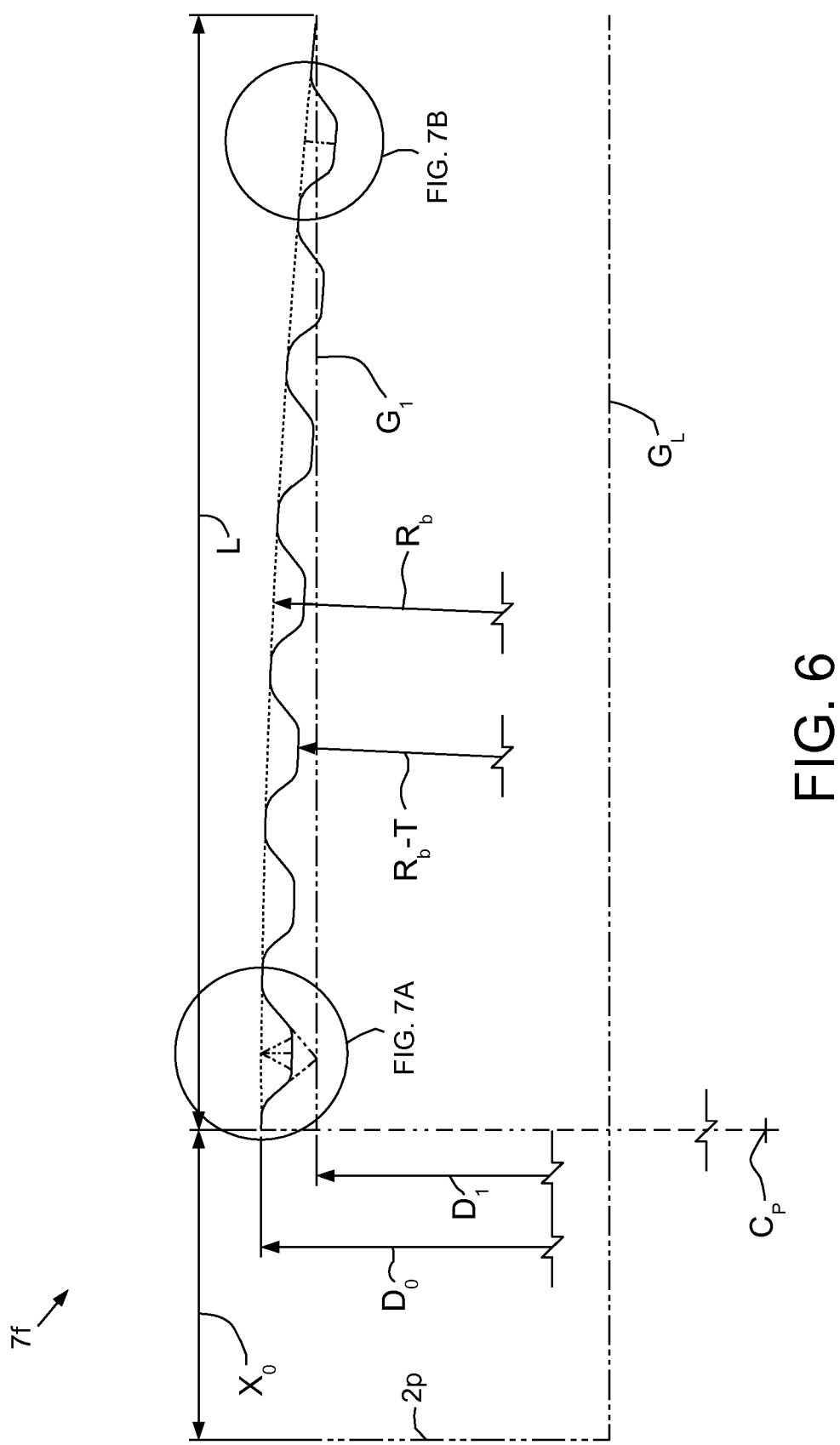
FIG. 6 illustrates a profile of the female cambered thread.
Figure 7A:
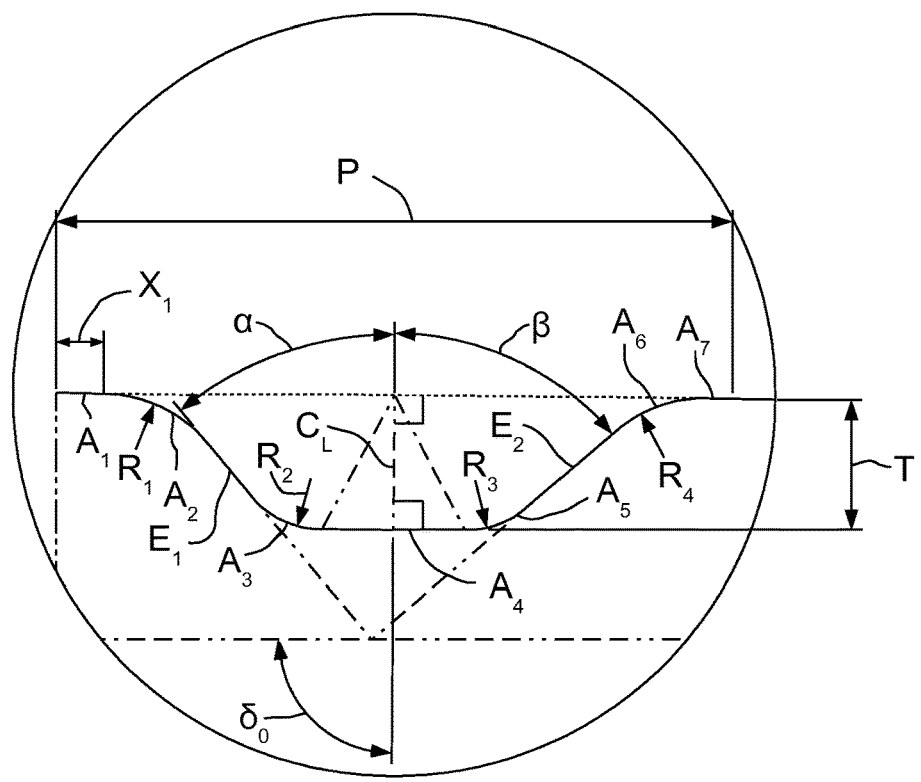
FIGS. 7A and 7B are enlargements of portions of FIG. 6.
Figure 7B:
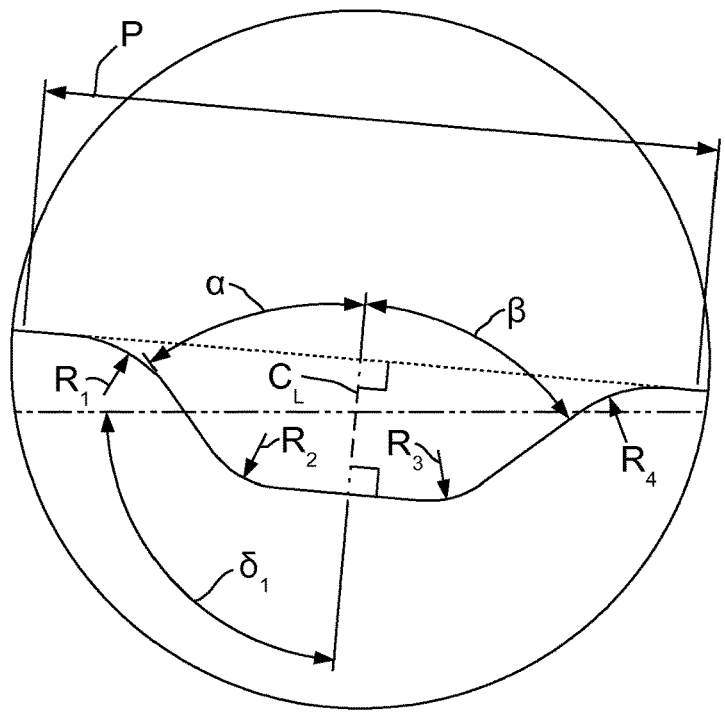

FIG. 6 illustrates a profile 7f of the female cambered thread 2t. FIGS. 7A and 7B are enlargements of portions of FIG. 6. Once the outline of the female thread 2t has been generated, the profile 7f may be determined. The profile 7f may start at a standoff distance $X_0$ from the top 2p. The profile 7f may end at a point where the root of the profile intersects an axis $G_1$ parallel to the longitudinal axis $G_L$ and offset to the end diameter $D_1$. The standoff distance $X_0$ of the female profile 7f may differ slightly from the standoff distance of the male profile 7m. The sweep angle γ may define the arcuate extent of the profile 7f from start to end and may range between one and 10 degrees.

Referring specifically to FIG. 7A, a thread-form of the profile 7f may include a first root $A_1$. The thread-form may have a trapezoidal shape. The first root $A_1$ may be an arc with the outer camber radius $R_b$ and may extend to a second arc $A_2$. The outer camber radius $R_b$ of the female profile 7f may differ slightly from the outer camber radius of the male profile 7m. The centerline $C_L$ may be inclined relative to the offset axis $G_1$ at an acute and nearly perpendicular first angle $\delta_0$. The second arc $A_2$ may have a radius less than one percent of the outer camber radius $R_b$. The second arc $A_2$ may extend from the first root $A_1$ to a non-contact flank $E_1$. The second arc $A_2$ may be tangential to the first root $A_1$ and the non-contact flank $E_1$. The non-contact flank $E_1$ may be a straight line inclined at a first flank angle α relative to the centerline $C_L$. The first flank angle α may range between 35 and 55 degrees.

The non-contact flank $E_1$ may extend from the second arc $A_2$ to a third arc $A_3$. The third arc $A_3$ may have a radius less than one percent of the outer camber radius $R_b$. The third arc $A_3$ may extend from the non-contact flank $E_1$ to a first crest $A_4$. The third arc $A_3$ may be tangential to the non-contact flank $E_1$ and the first crest $A_4$. The thread-form may have a height T between the first crest $A_4$ and a second root $A_7$. The first crest $A_4$ may be an arc with an inner camber radius $R_b$-T and may extend from the third arc $A_3$ to a fifth arc $A_5$. The inner camber radius $R_b$-T of the female profile 7f may differ slightly from the inner camber radius of the male profile 7m. As shown by the pair of phantom lines extending from endpoints of the first crest $A_4$, the centerline $C_L$ may extend through a midpoint of the first crest $A_4$. The centerline $C_L$ may be perpendicular to an arc of each camber radius $R_b$, $R_b$-T. The height T may be less than one percent of the outer camber radius $R_b$ such that the inner camber radius $R_b$-T is also greater than the outer diameter of the female coupling 2 as discussed above for the camber radius.

The fifth arc $A_5$ may have a radius less than one percent of the outer camber radius $R_b$. The fifth arc $A_5$ may extend from the first crest $A_4$ to a contact flank $E_2$. The fifth arc $A_5$ may be tangential to the first crest $A_4$ and the contact flank $E_2$. The contact flank $E_2$ may be a straight line inclined at a second flank angle β relative to the centerline $C_L$. The second flank angle β may range between 40 and 45 degrees. The first flank angle α may be less than the second flank angle β, thereby resulting in an asymmetric thread-form. The asymmetric thread-form is further illustrated by projections of the flanks $E_1$, $E_2$ intersecting at a point offset from the centerline $C_L$. The second flank angle of the female profile 7f may differ slightly from the second flank angle of the male profile 7m. The contact flank $E_2$ may extend from the fifth arc $A_5$ to a sixth arc $A_6$. The sixth arc $A_6$ may extend from the contact flank $E_2$ to the second root $A_7$. The sixth arc $A_6$ may be tangential to the contact flank $E_2$ and the second root $A_7$. The second root $A_7$ may be an arc with the outer camber radius $R_b$.

The thread-form may have an (arc length) pitch P between a start of the profile 7m and a center of the second root $A_7$. The first root $A_1$ may have an arc length $X_1$ which may also be equal to one-half the arc-length of the second root $A_7$. The arc length $X_1$ of the female profile 7f may differ from the arc length of the male profile 7m. The first crest $A_4$ may also have an arc length less than twice that of the arc length $X_1$.

Alternatively, the roots and crests may have the same arc lengths.

Referring specifically to FIG. 7B, due to the camber of the profile 7m about each camber radius $R_b$, $R_b$-T, the centerline $C_L$ of the thread-form adjacent to the end of the profile 7m may be inclined relative to the offset axis $G_1$ at a second acute angle 81 which is less than the first angle $\delta_0$.

Reference to the contact flanks $E_2$ and the non-contact flanks $E_1$ is for the context of drilling when the drill string is in compression. When tripping the drill string from the drilled hole and unscrewing the drill rods, the drill string is in tension and the contact flanks $E_2$ become the non-contact flanks and the non-contact flanks E become the contact flanks, as shown in FIG. 8.

FIG. 8 illustrates the male 4 and female 2 coupling parts screwed together. Once the thread profiles 7m,f have been generated, each profile may be adapted to create the geometry of the respective cambered thread 4t, 2t, such as by truncation thereof. The cambered curvature of each thread $2t$, $4t$ along the longitudinal axis $G_L$ may result in an frusto-ogive shape.

The invention claimed is:

1. A coupling for connecting downhole tubulars, comprising:
   a tubular body;
   a female coupling part having a female screw thread;
   a male coupling part having a male screw thread; and
   at least one thread of the male screw thread formed on an outer surface of the body, and the female screw thread formed in an inner surface of the body, wherein the at least one thread has a thread-form including a crest, a root, and a pair of flanks, the crest and the root each being cambered about a respective first and second camber radius along the entire length of the thread-form, and wherein each first and second camber radius is greater than an outer diameter of the coupling, wherein one of the flanks is a contact flank and the other flank is a non-contact flank when the female and male coupling parts are in compression, wherein each flank is straight, each thread-form has a centerline perpendicular to an arc of each respective camber radius, each flank has a flank angle inclined relative to the respective centerline, and each contact flank angle is greater than the respective non-contact flank angle.

2. The coupling according to claim 1, wherein each flank is connected to an adjacent crest and/or root by a respective arc.

3. The coupling according to claim 1, wherein the centerline of the thread-form perpendicular to the arc of each first and second camber radius is inclined relative to a longitudinal axis of the coupling by an acute and nearly perpendicular first angle adjacent to a start of the at least one thread and inclined by a second angle adjacent to an end of the at least one thread, the second angle being less than the first angle.

4. The coupling according to claim 1, wherein each first and second camber radius is at least 5 times greater than an outer diameter of the coupling.

5. The coupling according to claim 1, wherein the thread-form is asymmetric.

6. The coupling according to claim 1, wherein the thread-form is trapezoidal.

7. The coupling according to claim 1, wherein a sweep angle of the at least one thread ranges between one and 10 degrees.

8. The coupling according to claim 1, wherein the root and the crest are concentric.

9. The coupling according to claim 1, wherein an arc length of the root and an arc length of the crest are equal.

10. The coupling according to claim 1, wherein an arc length of the root and an arc length of the crest are not equal.

11. A connection, comprising a coupling according to claim 1, wherein the male screw thread of the male coupling part is screwed into the female thread of the female coupling part of an adjacent coupling.

12. The connection according to claim 11, wherein each non-contact flank angle is less than 45 degrees.

13. The connection according to claim 12, wherein each coupling is made from a metal or alloy, wherein the male coupling part has an outer diameter portion, a reduced diameter portion having the male thread, and a shoulder connecting the two portions, and wherein the shoulder is engaged with an end of the female coupling part to form a metal to metal seal.

14. A drill rod for percussive drilling, comprising:
   a rod body; and
   a coupling according to claim 1, the female coupling part having the female screw thread being welded to a first end of the rod body, and the male coupling part having the male screw thread being welded to a second end of the rod body.

15. The drill rod according to claim 14, wherein an outer diameter of the female and male coupling parts ranges between 5 and 20 centimeters, and wherein each first and second camber radius is greater than one meter.

16. A drill string comprising a drill rod according to claim 14.

* * * * *